(12) United States Patent
Takahashi et al.

(10) Patent No.: US 8,210,070 B2
(45) Date of Patent: Jul. 3, 2012

(54) MODIFIED CROWN REDUCTION GEAR

(75) Inventors: Takayuki Takahashi, Sendai (JP);
Hiroyuki Sasaki, Tsuruoka (JP);
Tomoya Masuyama, Tsuruoka (JP)

(73) Assignee: National University Corporation Fukushima University, Fukushima (JP)

( * ) Notice: Subject to any disclaimer, the term of this patent is extended or adjusted under 35 U.S.C. 154(b) by 163 days.

(21) Appl. No.: 12/674,942

(22) PCT Filed: Sep. 14, 2009

(86) PCT No.: PCT/JP2009/066036
§ 371 (c)(1),
(2), (4) Date: Feb. 24, 2010

(87) PCT Pub. No.: WO2010/134218
PCT Pub. Date: Nov. 25, 2010

(65) Prior Publication Data
US 2011/0162471 A1 Jul. 7, 2011

(30) Foreign Application Priority Data
May 22, 2009 (JP) .................................. 2009-123835

(51) Int. Cl.
*F16H 35/00* (2006.01)
*F16H 23/00* (2006.01)

(52) U.S. Cl. .......................................... 74/640; 475/163

(58) Field of Classification Search .................... 74/640; 475/163, 164
See application file for complete search history.

(56) References Cited

U.S. PATENT DOCUMENTS

| | | | | |
|---|---|---|---|---|
| 3,122,938 A | * | 3/1964 | Visser | 74/409 |
| 3,532,005 A | * | 10/1970 | Carpenter et al. | 74/640 |
| 4,041,808 A | | 8/1977 | Fickelscher | |
| 5,893,813 A | | 4/1999 | Yamamoto | |
| 2004/0220008 A1 | * | 11/2004 | Mingishi et al. | 475/163 |

FOREIGN PATENT DOCUMENTS

| | | |
|---|---|---|
| JP | 51-126467 A | 11/1976 |
| JP | 60-26833 A | 2/1985 |
| JP | 5-92557 U | 12/1993 |
| JP | 7-103291 A | 4/1995 |
| JP | 7-248047 A | 9/1995 |
| JP | 8-177987 A | 7/1996 |

OTHER PUBLICATIONS

International Search Report for the Application No. PCT/JP2009/066036 mailed Dec. 8, 2009.

* cited by examiner

*Primary Examiner* — Thomas R Hannon
*Assistant Examiner* — Phillip A Johnson
(74) *Attorney, Agent, or Firm* — Cheng Law Group, PLLC

(57) ABSTRACT

A reduction gear capable of satisfying, at high level, each of: realizing a high reduction ratio; preventing backlash by securing rotation smoothness; and carrying out compactification and weight saving of entire mechanism is provided. The reduction gear of the invention is a modified crown reduction gear, comprising: a pressing mechanism 16 operated to rotate; a fixed crown gear 2 fixed to an external member 15; a movable crown gear 1, wherein the difference in the number of teeth between the gears is one; and an output axis 3 flexibly attached to the gear 1. The gear 1 engages with the gear 2 at a slant by pressing-force provided from the mechanism 16. In this instance, contact locations of teeth of the gears 1 and 2 are dispersed at two places existing at both sides between which a gradient center line intervenes.

9 Claims, 6 Drawing Sheets

MODIFIED CROWN REDUCTION GEAR

TECHNICAL FIELD

The invention relates to a mechanical reduction gear capable of realizing a large reduction ratio.

BACKGROUND ART

Harmonic drive reduction gears and oscillating bevel reduction gears are well known as reduction gears capable of realizing a large reduction ratio.

The former, i.e., the harmonic drive reduction gear has a circular spline and a Flexspline which is two less in teeth number than the circular spline. The gear is a mechanism which continuously bends the Flexspline with a wave generator and thereby the Flexspline and the circular spline are engaged at two places (see Japanese Patent Application Publication Number 7 (1995)-103291).

The harmonic drive reduction gear has advantages of prevention of occurrence of backlash and smooth rotation by the engagement at the two places. However, the difference in teeth number needs to be set to an even number equal to or more than two from construction condition. Therefore, there is a problem that a reduction ratio is 2/N (N: teeth number) at most. In the harmonic drive reduction gear, there are issues that a large motor is required and thereby the whole mechanism grows in size and also causes weight increase, because a starting torque of gears also becomes large.

The latter, namely oscillating bevel reduction gear has a fixed bevel gear and a movable bevel gear between which difference in teeth number is one. The gear is a mechanism configured so that the movable bevel gear is pressed on the fixed bevel gear with an inclined disk united with an input axis and they perform precession movement while engaging with each other at one place (see Japanese Patent Application Publication Number 7 (1995)-248047).

In the oscillating bevel reduction gear, as the difference in teeth number is one, a reduction ratio can be set to 1/N (N: teeth number), it has an advantage capable of realizing a high reduction ratio. However, as the bevel gears are placed in contact at one place, there is a problem that rotation smoothness is reduced and backlash tends to take place. There are issues that the size in the axial direction is increased and thereby the whole mechanism grows in size and also causes weight increase, because the bevel gears are also combined with each other.

That is, the known harmonic drive or oscillating bevel reduction gear has difficulty in simultaneous pursuit of realizing a high reduction ratio, preventing backlash by rotation smoothness, compacting its entire mechanism and saving weight. Therefore, they are not suitable to be embedded in a knuckle of a robot hand or the like.

DISCLOSURE OF THE INVENTION

The present invention has been made to solve the aforementioned problems, and an object of the present invention is to provide a reduction gear capable of satisfying, at high level, each of: realizing a high reduction ratio; preventing backlash by securing rotation smoothness; and carrying out compactification and weight saving of its entire mechanism.

The present invention capable of solving the problems is a modified crown reduction gear comprising: a pressing mechanism 16 which is operated so as to rotate; a fixed crown gear 2, fixed to an external member 15, and a movable crown gear 1 between which the difference in teeth number is one; and an output axis 3 which is flexibly attached to the movable crown gear 1. The invention is characterized in that the movable crown gear 1 engages with the fixed crown gear 2 at a slant by pressing a force provided from the pressing mechanism 16; and contact locations of the teeth of the fixed crown gear 2 and the movable crown gear 1 are dispersed at two places existing at both sides between which a gradient center line (A) of the movable crown gear 1 intervenes.

In the modified crown reduction gear of the invention, since the difference in teeth number between the movable and fixed crown gears 1 and 2 is one, a high reduction ratio can be realized. In addition, rotation smoothness is secured and backlash is prevented from occurring because the engaging positions of the movable and fixed crown gears 1 and 2 are dispersed at two places of both sides between which the gradient center line intervenes. Moreover, the movable and fixed crown gears 1 and 2 are combined so that their teeth are engaged with each other, and accordingly size in the axial direction can be compacted in particular. As a large starting torque is not required, it is not necessary to use a large motor in order to drive and rotate the pressing mechanism 16. Therefore, the entire mechanism is compacted and the weight is saved. That is, in the modified crown reduction gear of the invention, realizing a high reduction ratio, preventing backlash by securing rotation smoothness, and carrying out compactification and weight saving of the entire mechanism are simultaneously satisfied.

In the modified crown reduction gear of the invention, it is desirable that the pressing mechanism 16 is attached to an input axis 6 so as to be driven together in a rotation direction; and the movable crown gear 1 and the output axis 3 are driven by reduction rotation in association with the rotation of combination of the input axis 6 and the pressing mechanism 16. Thereby, the movable crown gear 1 pressed on the fixed crown gear 2 with the pressing mechanism 16, per se, performs precession movement by simply driving and rotating the pressing mechanism 16 coupled to the input axis 6. The rotation is transmitted to the output axis 3. Therefore, the entire mechanism is compacted and also burden of manufacturing accuracy and assembling is reduced.

Preferably, the pressing mechanism 16 is configured so that it can oscillate with respect to the input axis 6 in the direction of an axis. Thereby, precision error of workpiece or the like can be absorbed by the oscillation of the pressing mechanism 16, and burden of manufacturing accuracy and assembling is further reduced.

It is desirable that the pressing mechanism 16 comprises: a pressing axis 7 which is attached to the input axis 6 to rotate together; an arm 8 extended radially from the pressing axis 7; and a pressing member 17 which is mounted on a tip of the arm 8 to press the back face of the movable crown gear 1. Thereby, each gravity center of components can be placed on the same axis as much as possible, and oscillation can be reduced. The size in the axial direction is compacted and the weight of the whole mechanism is saved.

Preferably the pressing member 17 is a roller 9 or a ball rolling on the back face of the movable crown gear 1 in the circumferential direction. Thereby, more smooth rotation is realized.

In the modified crown reduction gear of the invention, it is diserable that both or either of the fixed and movable crown gears 2 and 1 is made of flexible material. Thereby, the number of teeth engaging with each other at the two places of both sides is increased, and the rotation is further smoothed, so that lower oscillation and lower backlash can be realized.

Preferably the flexible material is polyacetal. Thereby the movable and fixed crown gears 1 and 2 can each have flexibility strength and impact resistance in a high level.

BEST MODE FOR CARRYING OUT THE INVENTION

Figure 1:
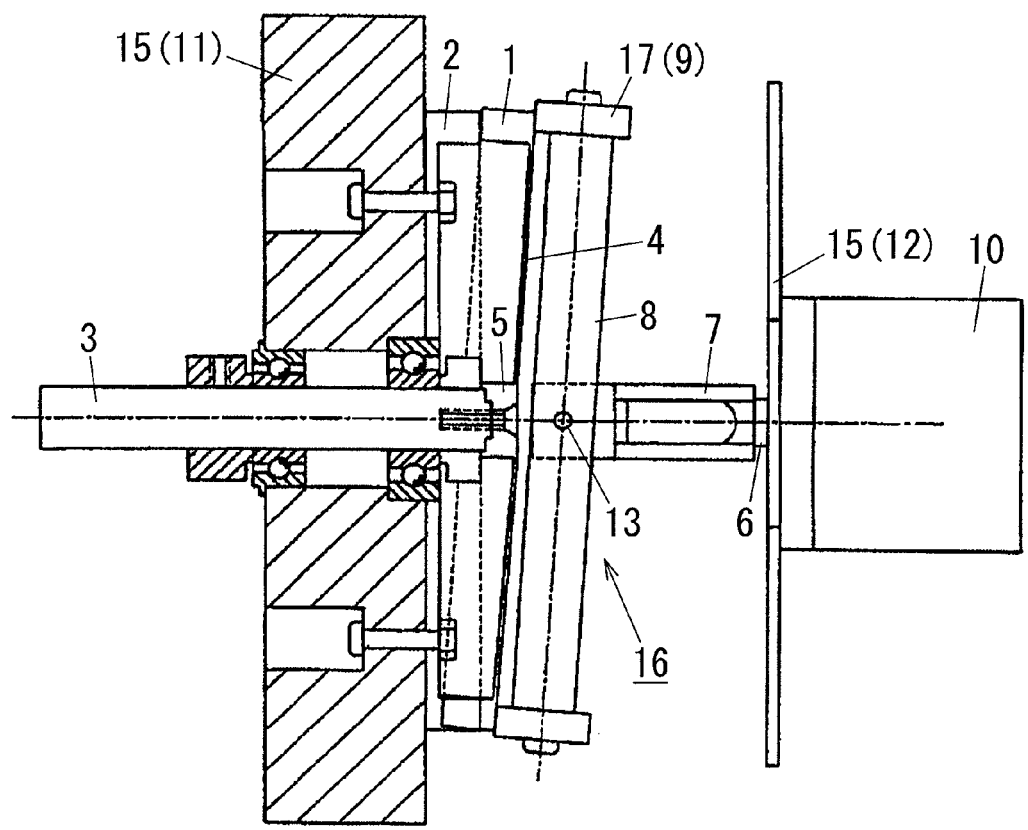
FIG. 1 illustrates a sectional view of a modified crown reduction gear in accordance with an embodiment of the present invention.
Figure 2:
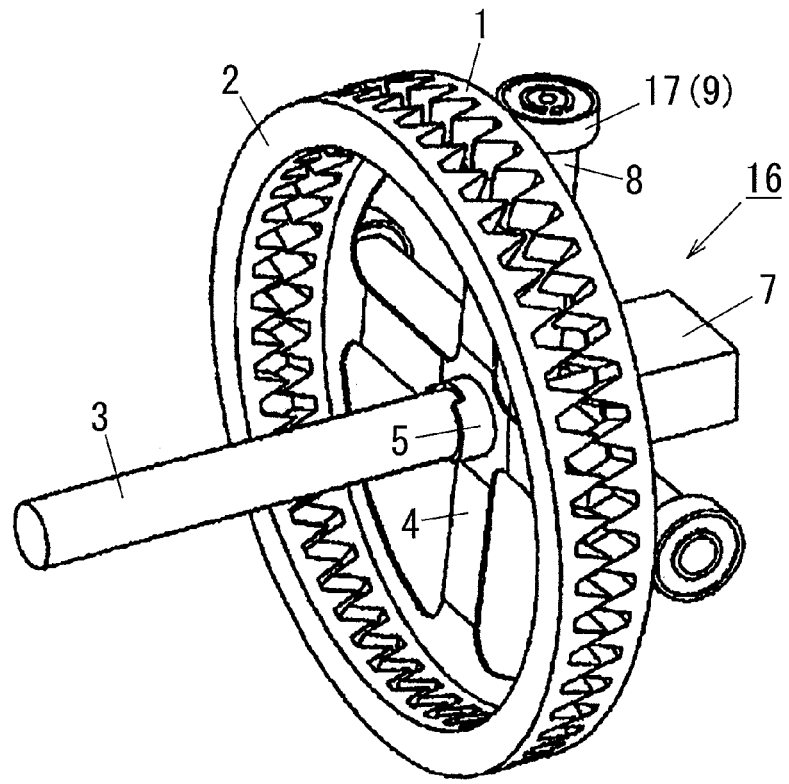
FIG. 2 is a perspective view of the modified crown reduction gear.
Figure 3:
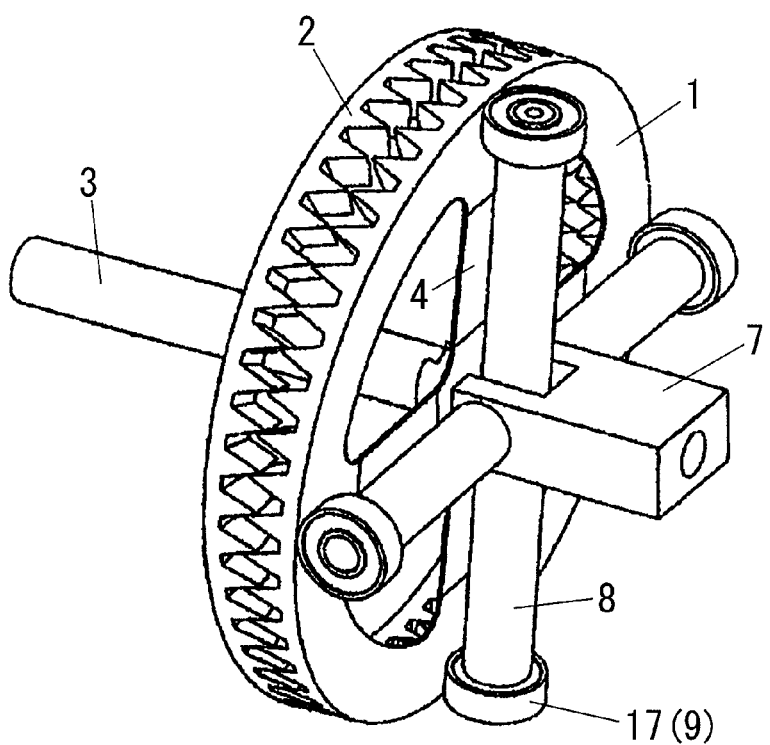
FIG. 3 is a perspective view of the modified crown reduction gear as seen from another direction.

The present invention will be explained based on the embodiments shown in the accompanying drawings. FIGS. 1-3 show a modified crown reduction gear in accordance with an embodiment of the present invention.

As shown in FIG. 1, an external member 15 on which the modified crown reduction gear is placed is formed of an anterior wall 11 and a posterior wall 12 which face in parallel to each other at a predetermined distance apart. A fixed crown gear 2 is fixed on the face of the anterior wall 11 facing the posterior wall 12, and a movable crown gear 1 is engaged with the fixed crown gear 2 at a slant. The fixed and movable crown gears 2 and 1 have the same external diameter as each other, while the difference in teeth number between them is set to one. Accordingly, if the movable crown gear 1 is pressed on the fixed crown gear 2 with a pressing mechanism 16 to be described, the teeth of the crown gears 1 and 2 are not exactly engaged with one another and an inclined state inevitably occurs.

The movable crown gear 1 has spokes 4 extended from the inner circumference edge to the center side of the movable crown gear 1, and a hub 5 coupled with the whole spokes 4 at the center of the movable crown gear 1. The hub 5 is fixed to a first end side of the output axis 3 supported by the anterior wall 11 so that the axis can rotate through a bearing. A second end side of the output axis 3 is stuck out of the opposite face to the face of the anterior wall 11 which the fixed crown gear 2 is fixed on. The spokes 4 may be members for flexibly coupling the movable crown gear 1 and the output axis 3, or may be arms, ribs or a plate-like body such as a diaphragm.

The pressing mechanism 16 is formed of a pressing axis 7 fixed to the tip of the input axis 6 to rotate together, an cross-shaped arm 8 extended radially from the pressing axis 7, and pressing members 17 mounted on tips of the arm 8 (see FIGS. 2 and 3). The pressing members 17 give pressing force to the back face of the movable crown gear 1 (i.e., the opposite face to the fixed crown gear 2 side), and press the movable crown gear 1 on the fixed crown gear 2. In this state, the arm 8 capable of oscillating in an axial direction takes a posture in association with an inclination of the back face of the movable crown gear 1. In addition, the arm 8 is a stick body in the shape of a cross, for increasing the stability of pressing, but may be a body in the shape of a rod, or may be any except the shape of a rod.

The arm 8 is configured so that it can oscillate at one freedom degree in the axial direction of the pressing axis 7 around an axis 13 perpendicular to the axial direction of the pressing axis 7 (see FIG. 1), and is driven so as to rotate together with the pressing axis 7 in the rotation direction. The movable crown gear 1 and the pressing mechanism 16 are combined so that the oscillating direction of the arm 8 agrees with an inclination direction of the movable crown gear 1. Each pressing member 17 at the tips of the arm 8 is a roller 9 supported so that it can roll in the circumferential direction. However, each member 17 may be a ball capable of rolling, or a thing which is fixed to the arm 8 and can slide on the movable crown gear 1.

A motor 10 for rotating the input axis 6 is attached to the opposite face to the face opposed to the anterior wall 11 in the posterior wall 12. The input axis 6 coupled to the motor 10 sticks out via a through-hole of the posterior wall 12, and is fixed to the pressing axis 7 in the space between the anterior and posterior walls 11 and 12.

If the input axis 6 is rotated with the motor 10, the cross-shaped arm 8 forming the pressing mechanism 16 rotates together with the input axis 6, and the movable crown gear 1 is pressed on the fixed crown gear 2 through the rollers 9 rolling on the back face of the movable crown gear 1 in the circumferential direction. Since the difference in teeth number between the fixed and movable crown gears 2 and 1 is one, the movable crown gear 1 is rotate at a large reduction ratio of one to the teeth number of the movable crown gear 1. The rotation of the movable crown gear 1 is transmitted to the output axis 3 through the flexible spokes 4 and the hub 5.

Engagement of the movable and fixed crown gears 1 and 2 is hereinafter described. The modified crown reduction gear according to the invention is characterized in that when the movable crown gear 1 engages with the fixed crown gear 2 at a slant by pressing-force provided from the pressing mechanism 16, contact locations of teeth of the movable and fixed crown gears 1 and 2 are dispersed at two places existing at both sides between which the gradient center line intervenes.

Figure 4:
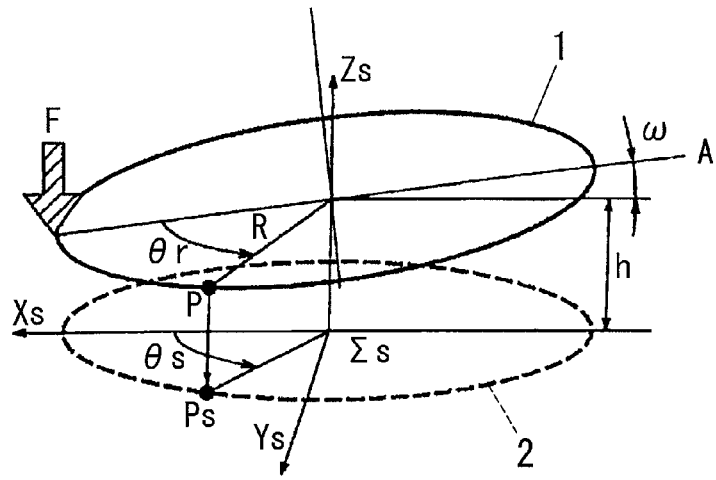
FIG. 4 is a model diagram of the modified crown reduction gear.

FIG. 4 shows a model diagram of the reduction gear. In this case, an outer peripheral edge of the bottoms of teeth in each of the movable and fixed crown gears 1 and 2 is defined as a reference circle. In FIG. 4, the circle drawn by a solid line is the reference circle of the movable crown gear 1, and the circle drawn by a dashed line is the reference circle of the fixed crown gear 2. Any radius of the reference circles is R, and Σs is a coordinate system fixed to the fixed crown gear 2.

The whole movable crown gear 1 is pressed in the normal direction to the plane of Xs-Ys. It is assumed that the gear 1 is most deeply pressed at the place shown by the arrow F in FIG. 4 in particular. The place is an intersecting point of the plane of Xs-Zs and the reference circle of the movable crown gear 1. At this time, it is assumed that the movable crown gear 1 inclines at an angle ω with respect to the fixed crown gear 2, and any teeth are in contact with each other. It is also assumed that the centers of the movable and fixed crown gears 1 and 2 are separated by distance h in the Zs-axis direction. P is a point on the movable crown gear 1 after rotation of an angle θr from the pressed place, Ps is a point obtained by mapping the point P onto the plane Xs-Ys at right angle, and θs is an angle about Ps. In addition, the point Ps is slightly apart from the reference circle of the fixed crown gear 2 in the central direction.

Figure 5:
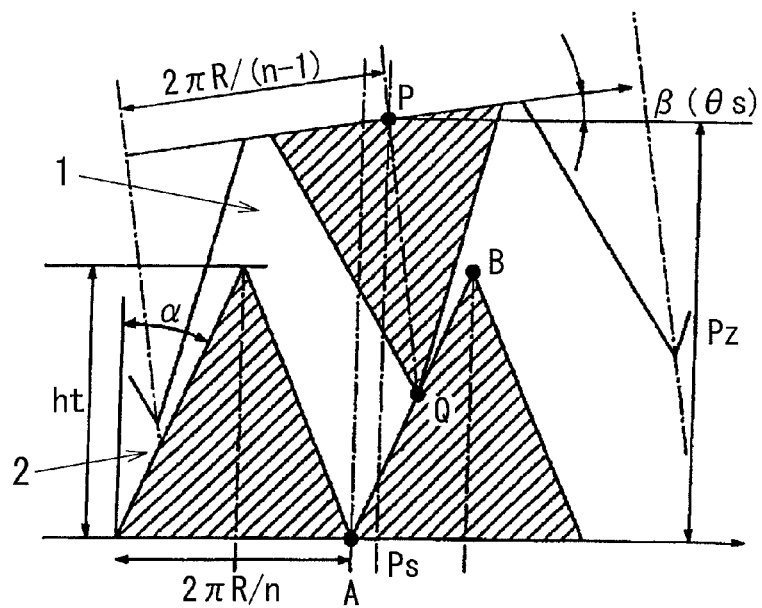
FIG. 5 is a model diagram of the engaging teeth in the modified crown reduction gear.

In the example, for the purpose of simplicity, each tooth shape of the movable and fixed crown gears 1 and 2 is in the shape of a triangle. FIG. 5 shows the contact model. This figure is a view of the contact state as seen in the origin direction of Σs from the outside of the reference circle. In truth, it is a cylindrical curved surface, but is approached to a plane.

Assuming that: ht, α and n are tooth height, tooth pressure angle and teeth number of the fixed crown gear 2, respectively; and teeth are arranged without space, a tooth pitch is 2πR/n and tooth height is given by $$ht = \pi R/(n \tan \alpha). \quad (1)$$

Assuming that each tooth of the movable crown gear 1 is the same shape and teeth number is (n−1), the pitch of the movable crown gear 1 is 2πR/(n−1). The teeth number may be (n+1), but (n−1) is used for explanation. Height Pz of the point P in the coordinate system Σs and the circumferential position of point Ps with reference to the his axis are respectively given by:

$$Pz = h - R \sin \omega \cos \theta r; \text{ and} \quad (2)$$

$$Ps = R \arctan 2(\sin \theta r, \cos \omega \cos \theta r), \quad (3)$$

where arctan 2 is a function that domain of arctan is extended to [−π, π].

The position Q in FIG. 5 is derived from P and angle β, where β is given by $$\sin \beta = d/d\theta r \times Pz/R = \sin \omega \sin \theta r. \quad (4)$$

A and B are easily derived from pitch and teeth number. The contact state is determined by A, B, P and Q.

By the way, h and ω are parameters for determining a relative position of the movable and fixed crown gears 1 and 2. In this mechanism, the difference in teeth number is one, and accordingly when the teeth number of the fixed crown gear 2 is an odd number, the apexes of the teeth face with each other at θr=θs=π and do not interfere, which gives a relationship presented by $$h + R \sin \omega \geq 2ht. \quad (5)$$

When the teeth number of the fixed crown gear 2 is an even number, the bottoms of the teeth face with each other at θr=θs=π and the analysis can be done in the same way. In this embodiment, the teeth number of the fixed crown gear 2 is set to an odd number. By the way, if ω is large, oscillation of the movable crown gear 1 becomes obviously large, and loss deforming the spokes 4 is also increased. Accordingly, ω should be decreased as soon as possible. Therefore, based on the expression (5), the following relationship is defined:

$$h + R \sin \omega = 2ht, \quad (6)$$

which represents the condition that tips of teeth of the movable and fixed crown gears 1 and 2 are in contact at θr=θs=π. Thereby, ω and h have subordinate relation. Therefore, in order to search a contact position(s), only ω will be changed.

Parameters for deciding a tooth shape are α and n, and the size is decided by R. They can be arbitrarily selected, but are selected, for reasons of trial in this embodiment, as follows:

α=20 deg, n=51, R=50 mm.

By changing ω per 0.000001 rad with a computer in order to seek contact positions, we found out that the contact occurs at ω=3.29 deg.

Figure 6:
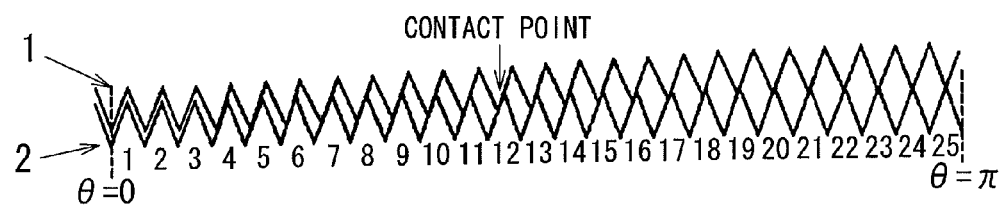
FIG. 6 is a state diagram of the engaging teeth in the modified crown reduction gear.

FIG. 6 shows the contact state. It is seen that, from distance between the fixed crown gear 2 and the tips of teeth of the movable crown gear 1 (hereinafter referred to as "interdental distance"), contact position is the twelfth tooth of the fixed crown gear 2. If each interdental distance before or after the contact position is calculated, the eleventh and thirteen teeth are 0.002017 mm and 0.008654 mm, respectively each of which is extremely minute.

This result shows that engagement of the movable and fixed crown gears 1 and 2 are dispersed at two places existing at both sides between which a gradient center line of the movable crown gear 1 (see a line A in FIG. 4) intervenes. In addition, it is seen that teeth in the proximity of teeth in contact are almost in contact.

In this modified crown reduction gear, since the difference in teeth number between the movable and fixed crown gears 1 and 2 is one, a high reduction ratio can be realized. When the teeth number of the movable crown gear 1 is N, the reduction ratio is 1/N. Since the substantial engagement positions of the movable and fixed crown gears 1 and 2 are dispersed at two places existing at both sides between which the gradient center line intervenes, backlash can be prevented. Teeth in the proximity of teeth in contact are almost in contact, and so rotation smoothness is secured. The movable and fixed crown gears 1 and 2 are a thin type each, and also combined so as to engage at a slight slant by themselves, and accordingly the size in the axial direction is very compacted in particular (see FIG. 1). A small motor can be used for the motor 10, because a large starting torque is not required. Therefore, compactification and weight saving of the entire mechanism are realized.

That is, in the modified crown reduction gear, realizing a high reduction ratio; preventing backlash by securing rotation smoothness; and carrying out compactification and weight saving of the entire mechanism are simultaneously satisfied. Thereby, it can be conveniently built in a knuckle of a robot hand or the like.

In addition, when at least one of the movable and fixed crown gears 1 and 2 is made of flexible material, teeth in the proximity of teeth in engagement also come to engage. According, as the rotation becomes further smooth, lower oscillation and backlash are realized. Polyacetal, nylon or the like is recited as the flexible material, but the other material can be adopted.

A second modified crown reduction gear in accordance with an embodiment of the present invention is now explained.

In this modified crown reduction gear, each tooth form of the movable and fixed crown gears 1 and 2 is characterized by not a triangular shape in the fore-mentioned first example but a trapezoidal shape obtained by pruning the top of the triangular shape. The fundamental configuration is the same as that of the first example, and so the characteristic configuration of the second example is explained in detail.

Figure 7:
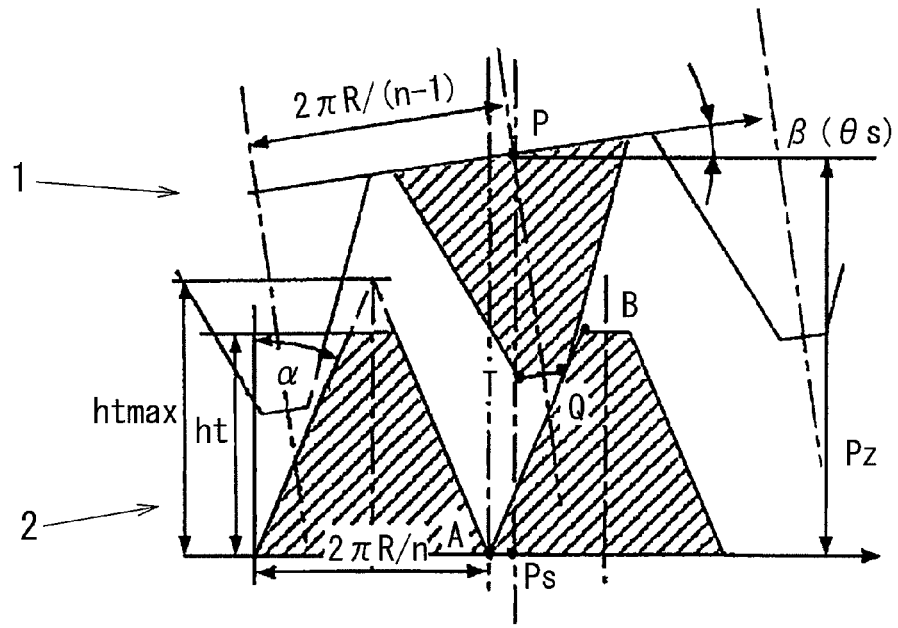
FIG. 7 is a model diagram of the engaging teeth in a modified crown reduction gear in accordance with an embodiment of the present invention.

FIG. 7 shows a contact model in the second example. Assuming that: ht, α and n are tooth height, tooth pressure angle and teeth number of the fixed crown gear 2, respectively; and teeth are arranged without space, a tooth pitch is $2\pi R/n$. Introducing a coefficient hr (=0.5–1.0), a possible value of the tooth height is given by $$ht = hr \times ht\max = hr \times \pi R/(n \tan \alpha). \quad (7)$$

However, the event of hr=1.0 shows a triangular tooth like the first example. It is assumed that each tooth of the movable crown gear 1 is also the same trapezoidal shape and the pitch is $2\pi R/(n-1)$. Height Pz of point P seen in the coordinate system $\Sigma s$ and the circumferential position of point Ps with reference to the Xs axis are respectively given by the expressions (2) and (3) in the first example. The positions Q and T in FIG. 5 are derived from P and angle $\beta$, where $\beta$ is derived from the expression (4) in the first example. A and B are easily derived from pitch and teeth number. In the second example, the contact state is determined by A, B, P Q and T.

By the way, h and $\omega$ are parameters for determining a relative position of the movable and fixed crown gears 1 and 2. In the first example, contact points are searched by using restraint condition for h and $\omega$, but in the trapezoidal teeth, the restraint condition cannot be used and therefore contact points are searched by changing each of h and $\omega$.

Figure 8:
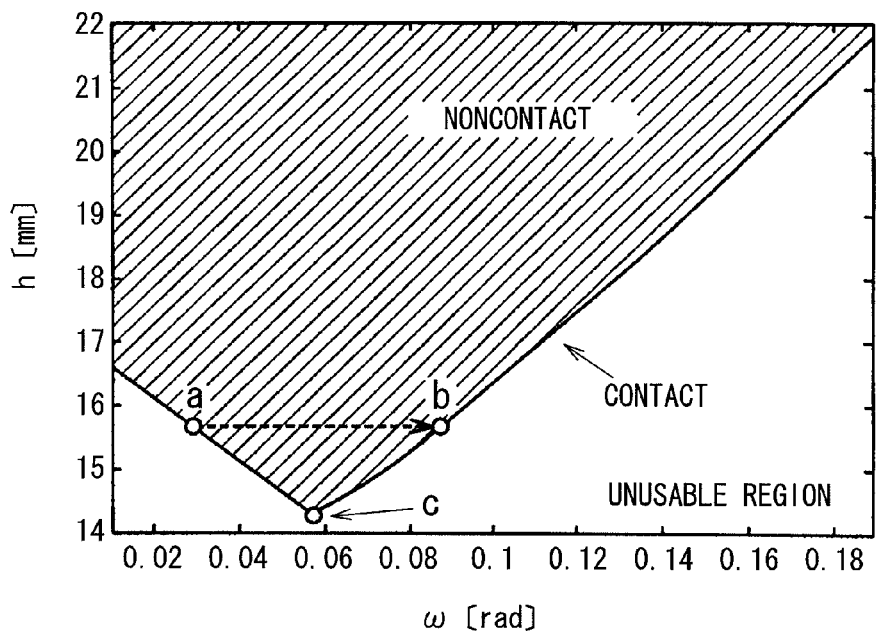
FIG. 8 is a graph showing w–h distribution for the case of hr=1.00 in the modified crown reduction gear.

In this instance, assuming that $\alpha=20$ deg, n=50 and R=50 mm, it is searched, with a computer, by: changing $\omega$ per 0.0002 rad in the range of [0.01:0.19]: and changing h per 0.00001 mm in the range of [0:2.5htmax]. FIG. 8 shows a result in the event of h=1.0 (i.e., triangular teeth like the first example) for reasons of explanation, and is obtained by plotting distribution of contact and noncontact in the horizontal axis $\omega$ and the vertical axis h. In this figure, the solid line shows contact distribution and the diagonal line area superior to the solid line shows noncontact distribution. The area inferior to the solid line shows an unusable region by interference of teeth.

It is explained that h is fixed at "a" in FIG. 8. In this instance, since the pressing mechanism 16 includes a freedom degree for oscillating the arm 8, $\omega$ can be changed. For example, as shown in the dashed line of the figure, a change from the position "a" in contact to another position "b" in contact via noncontact state is possible. At this time, backlash obviously occurs. On the other hand, in cases where h is fixed at c in FIG. 8, $\omega$ is also fixed and backlash is avoided.

Figure 9:
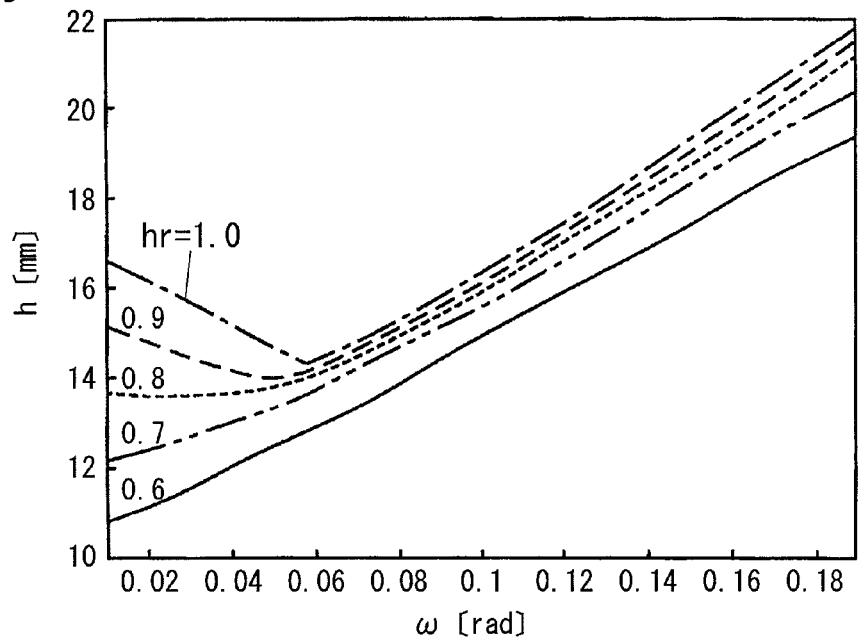
FIG. 9 is a graph showing w–h distribution for the case of hr=1.00, 0.9, 0.8, 0.7 and 0.6 in the modified crown reduction gear.

FIG. 9 is a graph that the event of hr=0.6, 0.7, 0.8, 0.9 (i.e., trapezoidal teeth) is added to FIG. 8. As is clear from the figure, in the event of hr=0.6, 0.7, there is no minimum point of h, which means that it is possible to press to h at $\omega=0$. In this instance, the movable crown gear 1 is parallel with the fixed crown gear 2, of which teeth are in a state of not engaging with each other. Thus, in order to realize engagement in low backlash, h needs having a minimum value at $\omega$–h distribution.

By the way, as described in the first example, if $\omega$ is large, oscillation of the movable crown gear 1 is increased and loss deforming the spokes 4 is also increased. Accordingly, it is desirable that $\omega$ is decreased as much as possible. In addition, it is desirable that the number of teeth in minuscule interdental distance (less than 0.01 mm) is increased in order to secure rotation smoothness and strength. The teeth number is hereinafter referred to as "nc".

By changing hr in the range of [0.8:1.0], $\omega$, minimum value of h (hereinafter referred to as "hm") and nc are calculated as shown in the following Table 1.

TABLE 1

| hr | $\omega$ [rad] | $\omega$ [deg] | hm [mm] | nc |
|---|---|---|---|---|
| 0.80 | 0.024008 | 1.375557 | 13.528247 | 2 |
| 0.82 | 0.037241 | 2.133752 | 13.717357 | 2 |

TABLE 1-continued

| hr | $\omega$ [rad] | $\omega$ [deg] | hm [mm] | nc |
|---|---|---|---|---|
| 0.84 | 0.037613 | 2.155066 | 13.830327 | 2 |
| 0.86 | 0.048844 | 2.798555 | 13.925057 | 4 |
| 0.88 | 0.048865 | 2.799758 | 13.950747 | 5 |
| 0.90 | 0.049117 | 2.814197 | 13.978197 | 6 |
| 0.92 | 0.049516 | 2.837058 | 14.009697 | 7 |
| 0.94 | 0.051166 | 2.931596 | 14.065457 | 5 |
| 0.96 | 0.052181 | 2.989751 | 14.117207 | 4 |
| 0.98 | 0.054943 | 3.148002 | 14.221477 | 4 |
| 1.00 | 0.056997 | 3.265688 | 14.316507 | 4 |

According to Table 1, hr=0.80 is suitable in cases where $\omega$ is preferentially decreased as much as possible. On the other hand, hr=0.92 is suitable in cases where the number of teeth in minuscule interdental distance is preferentially increased. FIGS. 10-13 show engagement state and interdental distance under those conditions.

Figure 10:
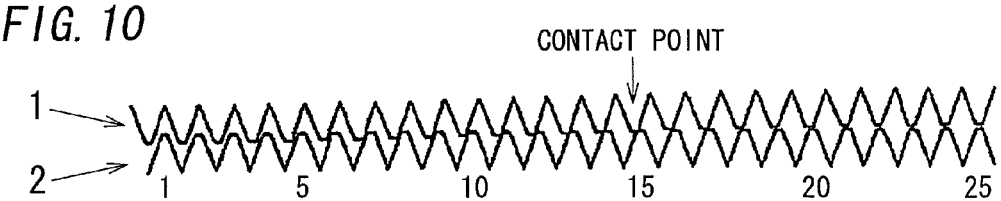
FIG. 10 is a state diagram of the engaging teeth for the case of hr=0.80 in the modified crown reduction gear.
Figure 11:
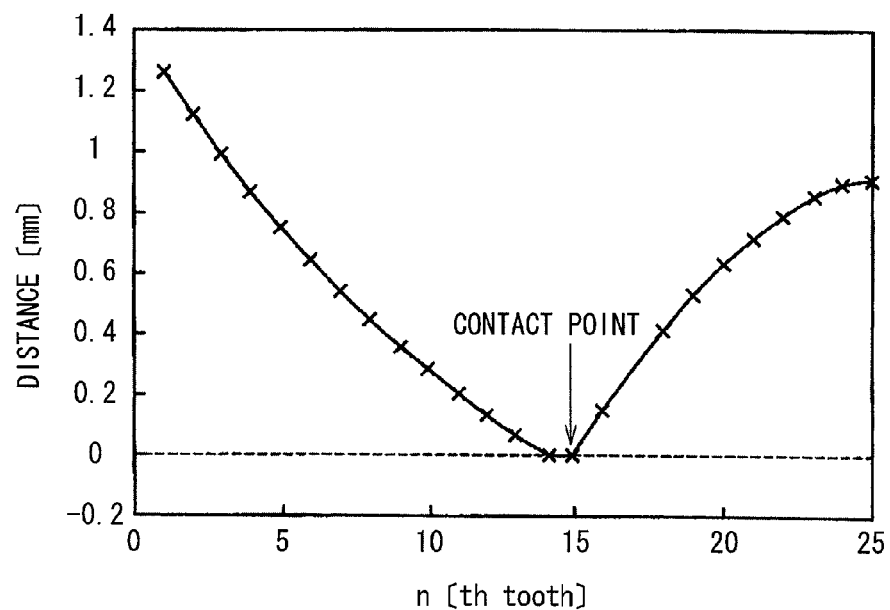
FIG. 11 is a graph showing interdental distance of each teeth for the case of hr=0.80 in the modified crown reduction gear.

FIGS. 10 and 11 are examples of hr=0.80. According to Table 1, in the event of hr=0.80, $\omega$ is decreased to less than half in comparison with triangular teeth like the first example (hr=1.0). However, nc has a small value of 2, and accordingly shallow engagement is obtained. As seen from FIG. 9, the bottom at minimum value of h is very shallow and so engagement becomes unstable.

Figure 12:
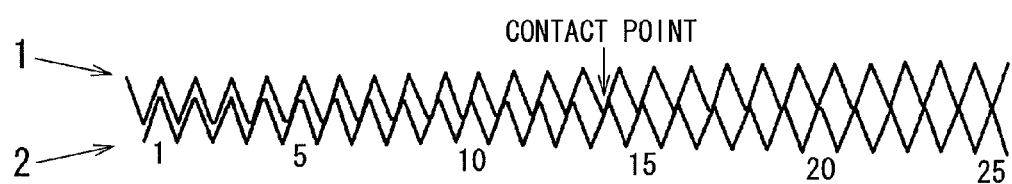
FIG. 12 is a state diagram of the engaging teeth for the case of hr=0.92 in the modified crown reduction gear.
Figure 13:
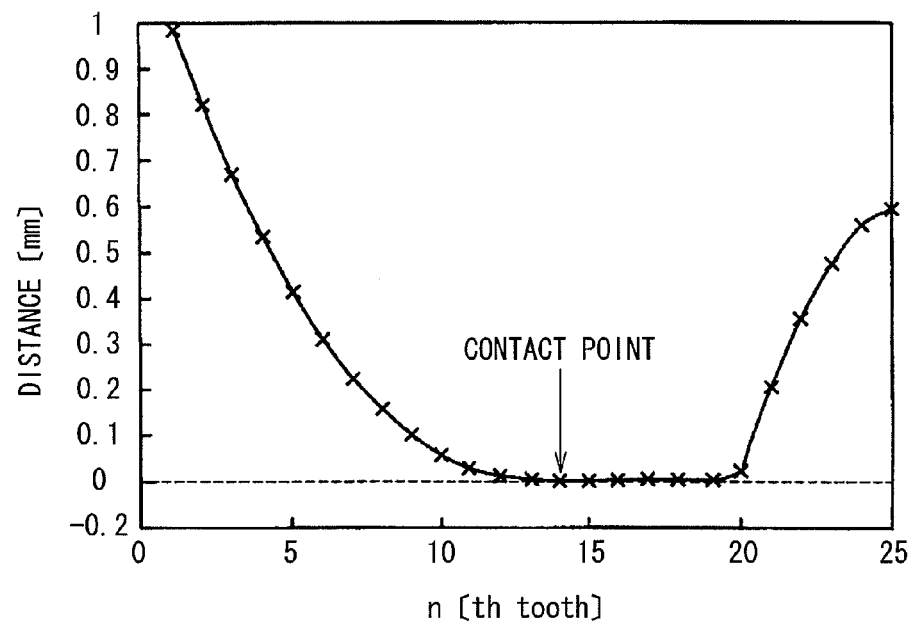
FIG. 13 is a graph showing interdental distance of each teeth for the case of hr=0.92 in the modified crown reduction gear.

FIGS. 12 and 13 are examples of hr=0.92. According to Table 1, in the event of hr=0.92, nc is largely increased in comparison with triangular teeth like the first example (hr=1.0). As seen from FIG. 9, the minimum value of h is deep and engagement is stable. Also, $\omega$ is decrease more than 10% in comparison with triangular teeth. As explained above, hr=0.92 seems to be of advantage.

The present invention has been explained based on the embodiments shown in the accompanying drawings, but is not limited to the embodiments and appropriate design variations can be made without departing from the true scope of this invention.

For example, not limited to a triangular or trapezoidal shape, each tooth shape of the movable and fixed crown gears 1 and 2 may be another tooth shape having different curve. In addition, it is preferable in such shape that h has a minimum value in $\omega$–h distribution in order to realize engagement by low backlash. The arm 8 pressed on the back face of the movable crown gear 1 has no need to be oscillated when having sufficiently-high accuracy in member manufacturing, and therefore may be fixed to the pressing axis 7 at a slant with respect to the fixed crown gear 2. In this instance, the movable crown gear 1 and the pressing mechanism 16 are combined so that an inclination direction of the arm 8 agrees with that of the movable crown gear 1.

The invention claimed is:

1. A modified crown reduction gear, comprising:
a pressing mechanism which is operated so as to rotate;
a fixed crown gear fixed to an external member;
a movable crown gear, wherein the difference in the number of teeth between the gears is one; and
an output axis which is flexibly attached to the movable crown gear, wherein the modified crown reduction gear is configured so that:
the movable crown gear engages with the fixed crown gear at a slant by a pressing force provided from the pressing mechanism; and
contact locations of the teeth of the fixed crown gear and the movable crown gear are dispersed at two places existing at both sides between which a gradient center line of the movable crown gear intervenes.

2. The modified crown reduction gear of claim 1, wherein the modified crown reduction gear is configured so that:
   the pressing mechanism is attached to an input axis so as to be driven together in a rotation direction; and
   the movable crown gear and the output axis are driven by reduction rotation in association with the rotation direction of a combination of the input axis and the pressing mechanism.

3. The modified crown reduction gear of claim 2, wherein the pressing mechanism is configured so that it can oscillate with respect to the input axis in the direction of the input axis.

4. The modified crown reduction gear of claim 3, wherein the pressing mechanism comprises:
   a pressing axis which is attached to the input axis to rotate together;
   an arm extended radially from the pressing axis; and
   a pressing member which is mounted on a tip of the arm to press a back face of the movable crown gear.

5. The modified crown reduction gear of claim 4, wherein the pressing member is a roller or a ball rolling on the back face of the movable crown gear in a circumferential direction.

6. The modified crown reduction gear of claim 2, wherein the pressing mechanism comprises:
   a pressing axis which is attached to the input axis to rotate together;
   an arm extended radially from the pressing axis; and
   a pressing member which is mounted on a tip of the arm to press a back face of the movable crown gear.

7. The modified crown reduction gear of claim 6, wherein the pressing member is a roller or a ball rolling on the back face of the movable crown gear in a circumferential direction.

8. The modified crown reduction gear of any one of claims 1-7, 4 and 5, wherein both or either of the fixed crown gear and the movable crown gear is made of a flexible material.

9. The modified crown reduction gear of claim 8, wherein the flexible material is polyacetal.

* * * * *